(12) United States Patent
Choi et al.

(10) Patent No.: US 12,478,269 B2
(45) Date of Patent: Nov. 25, 2025

(54) APPARATUS AND METHOD FOR ESTIMATING BIO-INFORMATION

(71) Applicant: SAMSUNG ELECTRONICS CO., LTD., Suwon-si (KR)

(72) Inventors: Jin Woo Choi, Suwon-si (KR); Jae Min Kang, Seoul (KR); Seung Woo Noh, Seongnam-si (KR); Sang Yun Park, Hwaseong-si (KR); Hye Rim Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 552 days.

(21) Appl. No.: 17/374,482

(22) Filed: Jul. 13, 2021

(65) Prior Publication Data

US 2022/0296115 A1 Sep. 22, 2022

(30) Foreign Application Priority Data

Mar. 19, 2021 (KR) ........................ 10-2021-0035741

(51) Int. Cl.
*A61B 5/022* (2006.01)
*A61B 5/00* (2006.01)
(Continued)

(52) U.S. Cl.
CPC ...... *A61B 5/02225* (2013.01); *A61B 5/02007* (2013.01); *A61B 5/02108* (2013.01); *A61B 2562/0247* (2013.01)

(58) Field of Classification Search
CPC ............ A61B 5/02225; A61B 5/02007; A61B 5/02108; A61B 2562/0247;
(Continued)

(56) References Cited

U.S. PATENT DOCUMENTS 10,398,324 B2 9/2019 Mukkamala et al.
10,772,512 B2 9/2020 Klaassen et al.
(Continued)

FOREIGN PATENT DOCUMENTS

CN 110613436 A 12/2019
CN 110881962 A 3/2020
(Continued)

OTHER PUBLICATIONS

Subhasri Chatterjee et al., "Monte Carlo Analysis of Optical Interactions in Reflectance and Transmittance Finger Photoplethysmography", Sensors, Feb. 15, 2019, vol. 19, No. 789, pp. 1-18 (18 pages total).
(Continued)

*Primary Examiner* — Justin Xu
(74) *Attorney, Agent, or Firm* — Sughrue Mion, PLLC

(57) ABSTRACT

An apparatus for estimating bio-information is provided. According to an embodiment of the present disclosure, the apparatus for estimating bio-information includes: a first sensor configured to measure a first pulse wave signal of a first wavelength and a second pulse wave signal of a second wavelength from an object; a second sensor configured to measure at least one of a force or a pressure applied to the object; and a processor configured to: generate an oscillometric waveform envelope based on the first pulse wave signal of the first wavelength and the at least one of the force or the pressure applied to the object; obtain a feature value from the oscillometric waveform envelope; predict a size of a measured blood vessel based on the second pulse wave signal of the second wavelength; correct the feature value based on the size of the measured blood vessel; and estimate the bio-information based on correcting the feature value.

12 Claims, 17 Drawing Sheets

(51) Int. Cl.
  *A61B 5/02*      (2006.01)
  *A61B 5/021*     (2006.01)
  *A61B 5/026*     (2006.01)
  *A61B 5/107*     (2006.01)
  *A61B 5/0225*    (2006.01)

(58) Field of Classification Search
  CPC ............ A61B 5/02116; A61B 5/02255; A61B 5/0261; A61B 5/1079; A61B 5/681; A61B 5/6817; A61B 5/6824; A61B 5/6826; A61B 5/6831; A61B 5/6843; A61B 5/6898; A61B 5/02125; A61B 5/7203; A61B 5/7225; A61B 5/7275; A61B 2560/0223
  See application file for complete search history.

(56) References Cited

U.S. PATENT DOCUMENTS

| | | | |
|---|---|---|---|
| 11,419,507 | B2 | 8/2022 | Kang et al. |
| 11,478,157 | B2 | 10/2022 | Kwon et al. |
| 11,690,520 | B2 | 7/2023 | Kang et al. |
| 2013/0331678 | A1 | 12/2013 | Lading et al. |
| 2016/0206221 | A1 | 7/2016 | Kim et al. |
| 2016/0360974 | A1* | 12/2016 | Lange .................. A61B 5/002 |
| 2017/0042433 | A1* | 2/2017 | Noh .................. A61B 5/14542 |
| 2019/0008399 | A1 | 1/2019 | Mukkamala et al. |
| 2019/0069784 | A1 | 3/2019 | Mukkamala et al. |
| 2019/0290141 | A1 | 9/2019 | Kawabata et al. |
| 2019/0298193 | A1* | 10/2019 | Krause .................. A61B 5/352 |
| 2019/0336016 | A1 | 11/2019 | Zhao et al. |
| 2019/0387985 | A1 | 12/2019 | Kang et al. |
| 2020/0077904 | A1 | 3/2020 | Kang et al. |
| 2020/0138305 | A1 | 5/2020 | Mukkamala et al. |
| 2020/0367760 | A1 | 11/2020 | Klaassen et al. |
| 2021/0204824 | A1* | 7/2021 | Wang .................. A61B 5/0082 |
| 2022/0031175 | A1 | 2/2022 | Kang et al. |

FOREIGN PATENT DOCUMENTS

| | | |
|---|---|---|
| JP | 5683759 B1 | 3/2015 |
| JP | 2018-102818 A | 7/2018 |
| KR | 10-1508870 B1 | 4/2015 |
| KR | 10-2020-0034422 A | 3/2020 |
| WO | 2015/098137 A1 | 7/2015 |
| WO | 2016/040253 A1 | 3/2016 |
| WO | 2019/223796 A1 | 11/2019 |
| WO | 2020/126576 A1 | 6/2020 |

OTHER PUBLICATIONS

Communication dated May 1, 2023, issued by the Korean Intellectual Property Office in Korean Patent Application No. 10-2021-0035741.

Communication issued Feb. 28, 2022 by the European Patent Office in counterpart European Patent Application No. 21195740.2.

Office Action dated Mar. 1, 2025, issued by Chinese Patent Office in Chinese Patent Application No. 202110835781.6.

* cited by examiner

APPARATUS AND METHOD FOR ESTIMATING BIO-INFORMATION

CROSS-REFERENCE TO RELATED APPLICATION(S)

This application is based on and claims priority under 35 U.S.C. § 119 to Korean Patent Application No. 10-2021-0035741, filed on Mar. 19, 2021, in the Korean Intellectual Property Office, the disclosure of which is incorporated by reference herein in its entirety.

BACKGROUND

1. Field

The disclosure relates to an apparatus and method for estimating bio-information, and more particularly to technology for estimating blood pressure based on oscillometry without using a cuff.

2. Description of Related Art

General techniques for extracting cardiovascular characteristics, such as blood pressure, and the like, without using a pressure cuff include a pulse wave analysis (PWA) method and a pulse wave velocity (PWV) method.

The pulse wave analysis (PWA) method is a method of extracting cardiovascular characteristics by analyzing the shape of a photoplethysmography (PPG) signal or a body surface pressure signal obtained from a peripheral part of the body such as a fingertip, a radial artery, or the like. The blood ejected from the left ventricle causes reflection at areas of large branches, such as the renal arteries and the iliac arteries, and the reflection affects the shape of the pulse wave or body pressure wave measured at the peripheral part of the body. Thus, by analyzing this shape, arterial stiffness, arterial age, aortic artery pressure waveform, or the like, can be inferred.

The pulse wave velocity (PWV) method is a method of extracting cardiovascular characteristics, such as arterial stiffness, blood pressure, or the like, by measuring a pulse wave transmission time. In this method, a delay (a pulse transit time (PTT)) between an R-peak (left ventricular contraction interval) of an electrocardiogram (ECG) and a peak of a PPG signal of a finger or the radial artery is measured by measuring the ECG and PPG signals of the peripheral part of the body and by calculating a velocity at which the blood from the heart reaches the peripheral part of the body by dividing an approximate length of the arm by the PTT.

SUMMARY

According to an aspect of an example embodiment, an apparatus for estimating bio-information may include a first sensor configured to measure a first pulse wave signal of a first wavelength and a second pulse wave signal of a second wavelength from an object; a second sensor configured to measure at least one of a force or a pressure applied to the object; and a processor configured to: generate an oscillometric waveform envelope based on the first pulse wave signal of the first wavelength and the at least one of the force or the pressure applied to the object; obtain a feature value from the oscillometric waveform envelope; predict a size of a measured blood vessel based on the second pulse wave signal of the second wavelength; correct the feature value based on the size of the measured blood vessel; and estimate the bio-information based on correcting the feature value.

The first wavelength may be an infrared wavelength, and the second wavelength may be a green wavelength.

The processor may generate the oscillometric waveform envelope based on a difference between a peak and a trough of an alternating current (AC) component of the first pulse wave signal of the first wavelength, and the at least one of the force or the pressure.

The processor may detect a characteristic point from the oscillometric waveform envelope; and obtain the feature value based on the characteristic point.

The characteristic point may include at least one of a peak point of the oscillometric waveform envelope, a preceding point preceding the peak point and corresponding to a predetermined ratio to an amplitude value of the peak point, and a following point following the peak point and corresponding to the predetermined ratio to the amplitude value of the peak point.

The feature value may include at least one of a force value, a pressure value, and an amplitude value of the characteristic point.

The processor may extract a direct current (DC) component of the second pulse wave signal of the second wavelength; and predict the size of the measured blood vessel based on a DC component value corresponding to the force value or the pressure value of the characteristic point.

The processor may normalize the DC component of the second pulse wave signal of the second wavelength; in response to a normalized DC component value, corresponding to the force value or the pressure value of the characteristic point, being less than a reference value, predict that the size of the measured blood vessel is less than a size of a target blood vessel; and in response to the normalized DC component value exceeding the reference value, predict that the size of the measured blood vessel is greater than the size of the target blood vessel.

The processor may, based on predicting that the size of the measured blood vessel is less than the size of the target blood vessel, increase the feature value; and based on predicting that the size of the measured blood vessel is greater than the size of the target blood vessel, decrease the feature value.

The processor may, based on a difference between the normalized DC component value and the reference value, determine a degree of increase or decrease in the feature value.

The processor may estimate the bio-information based on the feature value by using a bio-information estimation model.

The bio-information may include one or more of a blood pressure, a vascular age, an arterial stiffness, an aortic pressure waveform, a vascular compliance, a stress index, and a fatigue level.

According to an aspect of an example embodiment, a method of estimating bio-information may include measuring a first pulse wave signal of a first wavelength and a second pulse wave signal of a second wavelength from an object; measuring at least one of a force or a pressure applied to the object; generating an oscillometric waveform envelope based on the first pulse wave signal of the first wavelength and the at least one of the force or the pressure applied to the object; obtaining a feature value from the oscillometric waveform envelope; predicting a size of a measured blood vessel based on the second pulse wave signal of the second wavelength; correcting the feature value based on the size of the measured blood vessel; and estimating the bio-information based on correcting the feature value.

The first wavelength may be an infrared wavelength, and the second wavelength may be a green wavelength.

The generating of the oscillometric waveform envelope may include generating the oscillometric waveform envelope based on a difference between a peak and a trough of an alternating current (AC) component of the first pulse wave signal of the first wavelength, and the at least one of the force or the pressure applied to the object.

The method may include detecting a characteristic point from the oscillometric waveform envelope; and obtaining the feature value based on the characteristic point.

The characteristic point may include at least one of a peak point of the oscillometric waveform envelope, a preceding point preceding the peak point and corresponding to a predetermined ratio to an amplitude value of the peak point, and a following point following the peak point and corresponding to the predetermined ratio to the amplitude value of the peak point.

The feature value may include at least one of a force value, a pressure value, and an amplitude value of the characteristic point.

The method may include extracting a direct current (DC) component of the second pulse wave signal of the second wavelength; and predicting the size of the blood vessel based on a DC component value corresponding to the force value or the pressure value of the characteristic point.

The method may include normalizing the DC component of the second pulse wave signal of the second wavelength; in response to a normalized DC component value, corresponding to the force value or the pressure value of the characteristic point, being less than a reference value, predicting that the size of the measured blood vessel is less than a size of a target blood vessel; and in response to the normalized DC component value exceeding the reference value, predicting that the size of the measured blood vessel is greater than the size of the target blood vessel.

The method may include based on predicting that the size of the measured blood vessel is less than the size of the target blood vessel, increasing the feature value; and based on predicting that the size of the measured blood vessel is greater than the size of the target blood vessel, decreasing the feature value.

The method may include determining a degree of increase or decrease in the feature value based on a difference between the normalized DC component value and the reference value.

The estimating of the bio-information may include estimating the bio-information based on the feature value by using a bio-information estimation model.

According to an aspect of an example embodiment, an electronic device may include an apparatus for estimating bio-information, and an output device configured to output a processing result of the apparatus for estimating the bio-information. The apparatus for estimating the bio-information may include a first sensor configured to measure a first pulse wave signal of a first wavelength and a second pulse wave signal of a second wavelength from an object; a second sensor configured to measure at least one of a force or a pressure applied to the object; and a processor configured to: generate an oscillometric waveform envelope based on the first pulse wave signal of the first wavelength and the at least one of the force or the pressure applied to the object; obtain a feature value from the oscillometric waveform envelope; predict a size of a measured blood vessel based on the second pulse wave signal of the second wavelength; correct the feature value based on the size of the measured blood vessel; and estimate the bio-information based on correcting the feature value.

The electronic device may include at least one of a wristwatch wearable device, an ear-wearable device, and a mobile device.

The first wavelength may be an infrared wavelength, and the second wavelength may be a green wavelength.

The processor may detect a characteristic point from the oscillometric waveform envelope; and obtain the feature value based on the characteristic point.

The processor may extract a direct current (DC) component of the second pulse wave signal of the second wavelength; and predict the size of the measured blood vessel based on a DC component value corresponding to the force value or the pressure value of the characteristic point.

The processor may normalize the DC component of the second pulse wave signal of the second wavelength; in response to a normalized DC component value, corresponding to the force value or the pressure value of the characteristic point, being less than a reference value, predict that the size of the measured blood vessel is less than a size of a target blood vessel; and in response to the normalized DC component value exceeding the reference value, predict that the size of the measured blood vessel is greater than the size of the target blood vessel.

The processor may, based on predicting that the size of the measured blood vessel is less than the size of the target blood vessel, increase the feature value; and based on predicting that the size of the measured blood vessel is greater than the size of the target blood vessel, decrease the feature value.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
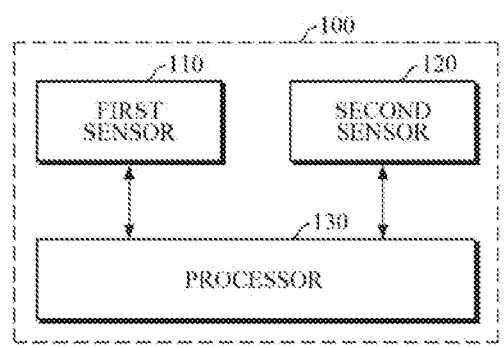
FIG. 1 is a block diagram illustrating an apparatus for estimating bio-information according to an embodiment of the present disclosure.

Details of example embodiments are included in the following detailed description and drawings. Advantages and features of the present disclosure, and a method of achieving the same will be more clearly understood from the following example embodiments described in detail with reference to the accompanying drawings. Throughout the drawings and the detailed description, unless otherwise described, the same drawing reference numerals will be understood to refer to the same elements, features, and structures.

It will be understood that, although the terms "first," "second," etc., may be used herein to describe various elements, these elements should not be limited by these terms. These terms are only used to distinguish one element from another. Also, the singular forms of terms are intended to include the plural forms of the terms as well, unless the context clearly indicates otherwise. It will be further understood that when an element is referred to as "comprising" another element, the element might not exclude one or more other elements, but may further include one or more other elements, unless explicitly described to the contrary. In the following description, terms such as "unit" and "module" indicate a unit for processing at least one function or operation and they may be implemented by using hardware, software, or a combination thereof.

Hereinafter, example embodiments of an apparatus and method for estimating bio-information will be described in detail with reference to the accompanying drawings.

Various example embodiments of the apparatus for estimating bio-information, which will be described below, may be mounted in terminals, such as a smart phone, a tablet personal computer (PC), a desktop computer, a laptop computer, etc., or wearable devices, and the like. In this case, examples of the wearable devices may include a wristwatch-type wearable device, a bracelet-type wearable device, a wristband-type wearable device, a ring-type wearable device, a glasses-type wearable device, a headband-type wearable device, etc., but the wearable devices are not limited thereto.

FIG. 1 is a block diagram illustrating an apparatus for estimating bio-information according to an embodiment of the present disclosure.

Referring to FIG. 1, the apparatus 100 for estimating bio-information includes a first sensor 110, a second sensor 120, and a processor 130.

The first sensor 110 measures a PPG signal (hereinafter referred to as a "pulse wave signal") from an object. For example, the first sensor 110 may measure pulse wave signals of a first wavelength (e.g., infrared wavelength) and a second wavelength (e.g., green wavelength) which are different from each other. In this case, the object may be an area of the human body which may contact the first sensor 110, and may be a body part at which pulse waves may be easily measured by PPG. For example, the object may be a finger where blood vessels are densely distributed, but the object is not limited thereto and may be an area on the wrist that is adjacent to the radial artery, or a peripheral part of the body, such as an upper portion of the wrist, toes, etc., where veins or capillaries are located.

The first sensor 110 may include, for example, an infrared light source configured to emit light of an infrared wavelength onto the object, and a green light source configured to emit light of a green wavelength onto the object. Further, the first sensor 110 may include a light receiver disposed at a predetermined distance from the light sources, and configured to acquire a pulse wave signal of a green wavelength and a pulse wave signal of an infrared wavelength by detecting light scattered or reflected from the object. The light source may include a light emitting diode (LED), a laser diode (LD), a phosphor, etc., but is not limited thereto. Further, the light receiver may include a photodiode, a photodiode array, a complementary metal-oxide semiconductor (CMOS) image sensor, a charge-coupled device (CCD) image sensor, and the like.

Based on an object being in contact with the first sensor 110 and increasing or decreasing a pressing force to induce a change in pulse wave amplitude, the second sensor 120 may measure force/pressure applied to the object. Here, the "force/pressure" refers to at least one of force and pressure. The second sensor 120 may include a single force sensor including a strain gauge, and the like, or may include a force sensor array, a pressure sensor, an air bladder type pressure sensor, a pressure sensor in combination with a force sensor and an area sensor, and the like.

The processor 130 may be electrically connected to the first sensor 110 and the second sensor 120. The processor 130 may control the first sensor 110 and the second sensor 120 for estimating blood pressure, and may receive pulse wave signals and force/pressure data from the first sensor 110 and the second sensor 120.

The processor 130 may preprocess the received pulse wave signal. For example, the processor 130 may reduce noise, such as motion noise, by using a noise reduction method such as filtering, smoothing, and the like. For example, the processor 130 may perform band pass filtering on the pulse wave signal, with a cut-off frequency of 1 Hz to 10 Hz.

The processor 130 may estimate bio-information by using the received pulse wave signal of the first wavelength, the force/pressure, and the pulse wave signal of the second wavelength. In this case, the bio-information may include blood pressure, vascular age, arterial stiffness, aortic pressure waveform, vascular compliance, stress index, fatigue level, skin age, skin elasticity, etc., but is not limited thereto. For convenience of explanation, the following description will be made using blood pressure as an example.

The processor 130 may generate an oscillometric waveform envelope based on the pulse wave signal of the first wavelength (e.g., infrared wavelength) and the force/pressure, and may estimate blood pressure by using the generated oscillometric waveform envelope. The processor 130 may obtain a feature value associated with blood pressure from the oscillometric waveform envelope of the infrared wavelength, and may obtain an estimated blood pressure value by inputting the obtained feature value into a predefined blood pressure estimation model. The blood pressure estimation model may be a model for converting a feature value, measured from a size of a target blood vessel of an object, such as a finger, into blood pressure in the upper arm artery. In this case, based on the object contacting the first sensor 110, a size of an actually measured blood vessel may be different from a size of a target blood vessel according to the contact position. Accordingly, the processor 130 may predict a size of the actually measured blood vessel by using the pulse wave signal of the second wavelength (e.g., green wavelength), and may correct a feature value extracted from the oscillometric waveform envelope of the first wavelength, so that the feature value may correspond to the size of the target blood vessel.

Hereinafter, an example of estimating blood pressure will be described with reference to FIGS. 2 to 5C.

Figure 2:
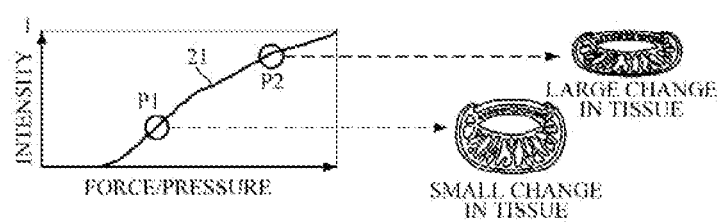
FIG. 2 is a diagram explaining a relationship between a DC component of a pulse wave signal having a green wavelength and a tissue change.

FIG. 2 is a diagram explaining a relationship between a DC component of a pulse wave signal having a green wavelength and a tissue change.

In the graph of FIG. 2, the X axis indicates force/pressure applied to an object, and the Y axis indicates a normalized DC component 21 of a pulse wave signal having a green wavelength. The DC component 21 of the pulse wave signal having a green wavelength increases with increasing force/pressure applied to the object, which shows that the DC component 21 has a certain correlation with a change in tissue/blood vessel of the object. That is, it can be seen that a tissue change is small at a point P1 where the DC component 21 is relatively low, and a tissue change is large at a point P2 where the DC component 21 is relatively high. Accordingly, the tissue change may be estimated by using the DC component 21 of the pulse wave signal having the green wavelength, and a blood vessel size may be predicted indirectly based on the estimated tissue change. For example, if a tissue change is small, the tissue change may be predicted from a blood vessel having a relatively small size (pressure in the blood vessel is relatively low), and if a tissue change is large, the tissue change may be predicted from a blood vessel having a relatively large size (pressure in the blood vessel is relatively high). As described above, a size of a measured blood vessel at a measurement position of the object may be predicted by using the DC component of the pulse wave signal having the green wavelength, and blood pressure may be estimated by using the predicted blood vessel size information, thereby improving accuracy.

FIGS. 3A to 3D are diagrams explaining feature values associated with blood pressure according to the size of blood vessels of a subject in which a reference blood pressure is the same, and a change in DC component of a pulse wave signal having a green wavelength.

Figure 3A:
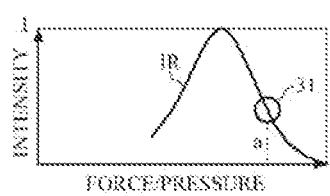
FIGS. 3A to 3D are diagrams explaining feature values associated with blood pressure according to the size of blood vessels of a subject in which a reference blood pressure is the same, and a change in DC component of a pulse wave signal having a green wavelength.
Figure 3B:
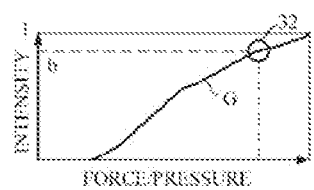
Figure 3C:
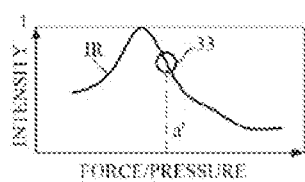

FIGS. 3A and 3C illustrate oscillometric waveform envelopes IR generated by using a pulse wave signal of an infrared wavelength, measured from a large blood vessel and a small blood vessel of a subject in which the reference blood pressure (e.g., cuff blood pressure) is the same, and force/pressure. It can be seen that when characteristic points 31 and 33 associated with blood pressure are extracted based on the same criteria from the respective oscillometric waveform envelopes IR of different blood vessel sizes, force/pressure values a and a' of the respective characteristic points 31 and 33 may be different values. In this case, when the force/pressure values a and a' of the respective characteristic points 31 and 33, as feature values for estimating blood pressure, are applied to a blood pressure estimation model, the estimated blood pressure values are different although the reference blood pressure is the same, such that an error may occur according to the size of the measured blood vessels.

Figure 3D:
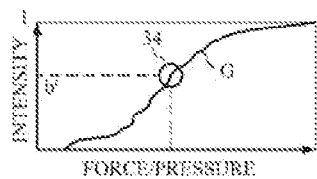

FIGS. 3B and 3D illustrate normalized DC components G of the pulse wave signal having the green wavelength measured from a relatively large blood vessel and a relatively small blood vessel of a subject in which the reference blood pressure is the same. In FIGS. 3B and 3D, points 32 and 34 correspond to the characteristic points 31 and 33, respectively, which are extracted from the oscillometric waveform envelopes IR of FIGS. 3A and 3C. It can be seen that a change in DC components b and b' between the respective points 32 and 34 corresponds to a change in force/pressure values a and a' between the respective characteristic points 31 and 33. As illustrated in FIG. 2, an intensity of the DC component has a certain correlation with a change in tissue/blood vessel size according to a change in force/pressure, such that by using the DC components of a target blood vessel and a measured blood vessel, a relative size of the measured blood vessel may be predicted, and the feature value may be corrected based on the predicted size of the blood vessel.

Figure 4A:
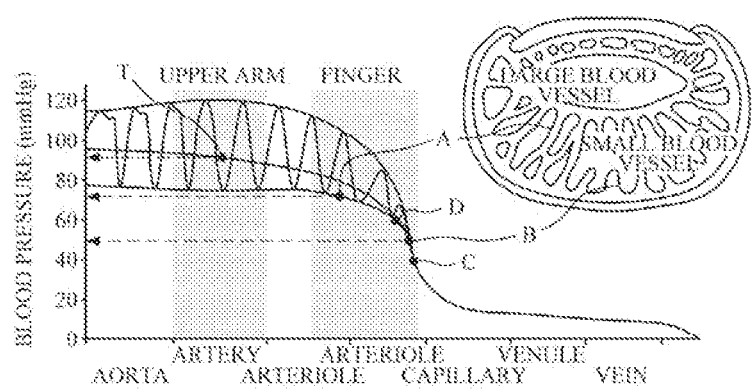
FIG. 4A is a diagram illustrating a change in blood vessel size according to various measurement positions.
Figure 4B:
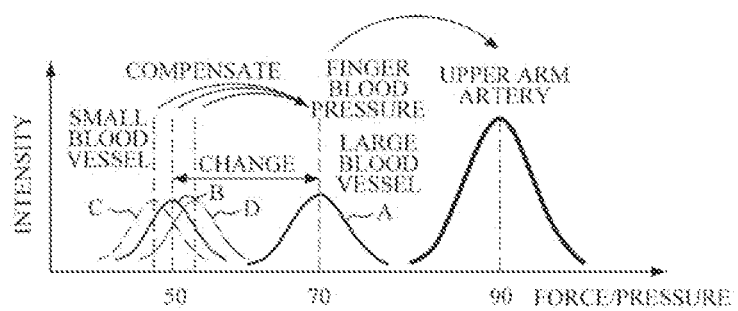
FIG. 4B is a diagram explaining an example of correcting a feature value according to a predicted blood vessel size.

FIG. 4A is a diagram illustrating a change in blood vessel size according to various measurement positions. FIG. 4B is a diagram explaining an example of correcting a feature value according to a predicted blood vessel size. Referring to FIGS. 4A and 4B, when a blood vessel A having a relatively large size is set as a target blood vessel for estimating blood pressure from a finger, a blood pressure estimation model may be defined to convert a feature value, extracted from an oscillometric waveform envelope of the target blood vessel A, into blood pressure in the upper arm artery T. As illustrated herein, when pulse wave signals are measured from blood vessels B, C, and D having a relatively smaller size than the target blood vessel A of the finger, feature values, extracted from oscillometric waveform envelopes of the blood vessels having a relatively smaller size, may be corrected and then may be applied to a blood pressure estimation model.

Based on the pulse wave signal of an infrared wavelength and force/pressure being measured from the object, the processor 130 may generate an oscillometric waveform envelope based on a difference between peak and trough of the AC component of the measured pulse wave signal having the infrared wavelength, and the force/pressure.

Figure 5A:
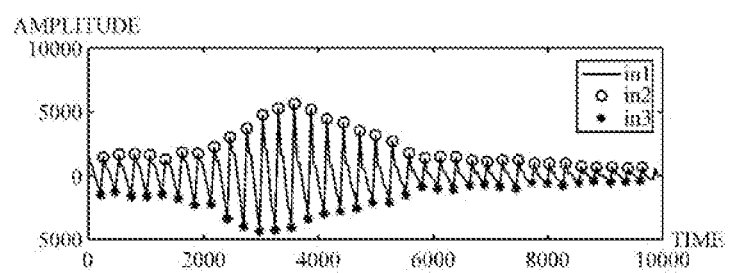
FIGS. 5A to 5C are diagrams explaining an example of obtaining an oscillometric waveform envelope by using a pulse wave signal of an infrared wavelength.
Figure 5B:
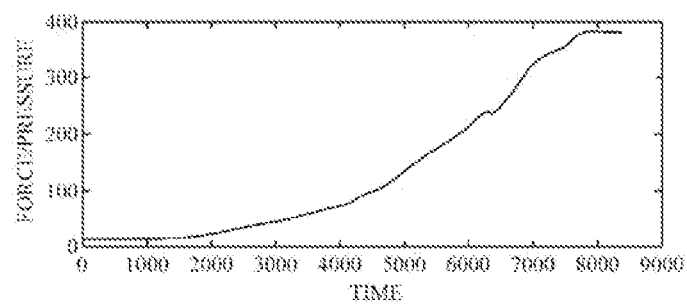
Figure 5C:
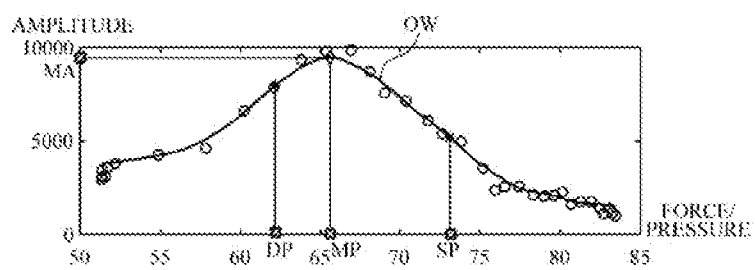

For example, FIGS. 5A to 5C are diagrams explaining an example of obtaining an oscillometric waveform envelope by using the pulse wave signal of the infrared wavelength, in which FIG. 5A illustrates an AC component of the pulse wave signal having the infrared wavelength, FIG. 5B illustrates force/pressure, and FIG. 5C illustrates an oscillometric waveform envelope.

Referring to FIGS. 5A to 5C, the processor 130 may extract a peak-to-peak point by subtracting an amplitude value of a negative (−) point, such as trough amplitude value in3, from an amplitude value of a positive (+) point, such as a peak amplitude value in2, of a pulse wave envelope in1 at each measurement time point of the pulse wave signal, and may obtain an oscillometric waveform envelope (OW) by plotting a peak-to-peak amplitude at each measurement time point against a force/pressure value at a corresponding time point and by performing, for example, polynomial curve fitting.

The processor 130 may detect characteristic points from the obtained oscillometric waveform envelope OW, and may obtain, as feature values, force/pressure values, amplitude values, and the like, of the detected characteristic points. For example, the processor 130 may detect, from the oscillometric waveform envelope OW, a peak point, a first point located in an interval preceding the peak point and corresponding to an amplitude value having a first ratio (e.g., 0.5 to 0.7) relative to the amplitude value MA of the peak point, and/or a second point located in an interval following the peak point and corresponding to an amplitude value having a second ratio (e.g., 0.5 to 0.7) relative to the amplitude value MA of the peak point, and may obtain force/pressure values MP, DP, and SP at the detected peak point, the first point, and/or the second point as feature values of mean arterial pressure (MAP), diastolic blood pressure (DBP), and systolic blood pressure (SBP), respectively.

Based on the pulse wave signal of the green wavelength being obtained from the object, the processor 130 may extract DC components from the pulse wave signal of the green wavelength by using, for example, a band pass filter, a low pass filter, and the like. Further, the processor 130 may normalize DC component values at each time point. For example, by using a method of dividing the DC component value at each time point by a maximum value, and the like, the processor 130 may normalize the DC component values so that the DC component value at each time point may be in a range of 0 to 1.

The processor 130 may predict a size of the measured blood vessel based on the normalized DC component values. For example, the processor 130 may compare a DC component value, corresponding to a force/pressure value of a characteristic point extracted from the oscillometric waveform envelope, with a reference value. Based on the DC component value being less than the reference value, the processor 130 may predict that a size of the measured blood vessel is relatively smaller than a size of the target blood vessel; and based on the DC component value exceeding the reference value, the processor 130 may predict that a size of the measured blood vessel is relatively larger than a size of the target blood vessel. In this case, the reference value may be defined for each user, and may be, for example, a DC component value of the pulse wave signal having the green wavelength, which corresponds to a force/pressure value of a characteristic point extracted from the oscillometric waveform envelope of the infrared wavelength which is measured from the target blood vessel of the object at a calibration time. The reference value may be determined individually for each of the feature values MAP, DBP, and SBP, and the processor 130 may correct each of the feature values MAP, DBP, and SBP by individually comparing the DC component values, corresponding to the force/pressure values MP, DP, and SP of the respective characteristic points, with the reference value.

Based on predicting that the measured blood vessel size is relatively smaller than the target blood vessel size, the processor 130 may increase a feature value, extracted from the oscillometric waveform envelope of the infrared wavelength for estimating blood pressure. In contrast, based on predicting that the measured blood vessel size is relatively larger than the target blood vessel size, the processor 130 may decrease the feature value. The processor 130 may determine a degree of increase or decrease in the feature value based on a difference between the DC component value, corresponding to the force/pressure value of the characteristic point extracted from the oscillometric waveform envelope, and the reference value, and the processor 130 may reflect the determined degree of increase or decrease in the feature value.

For example, assuming that FIG. 3A illustrates a case of the target blood vessel and FIG. 3B illustrates a case of the measured blood vessel, the DC component value b' of the point 34, corresponding to the force/pressure value a' of the characteristic point 33 in the measured blood vessel, is less than the reference value b of the point 32 corresponding to the force/pressure value a of the characteristic point 31 in the target blood vessel, such that the processor 130 may predict that the size of the measured blood vessel is relatively smaller than the target blood vessel; and based on a difference between the DC component value b' and the reference value b, or according to predetermined criteria, the processor 130 may increase the feature value a', obtained from the measured blood vessel, by a difference adjustment value, to obtain a corrected feature value.

The processor 130 may estimate blood pressure by applying the corrected feature value to a blood pressure estimation model. The following Equation 1 is an example of a blood pressure estimation model defined as a simple linear function. However, the blood pressure estimation model is not limited thereto, and may be pre-defined by various methods such as linear/nonlinear regression analysis, a neural network, deep learning, and the like.

$$y=ax+b \qquad \text{[Equation 1]}$$

In Equation 1, "y" denotes the estimated blood pressure value, "x" denotes the corrected feature value, "a" denotes a pre-defined adjustment coefficient of the feature value, and "b" is an offset value and may be, for example, cuff blood pressure obtained at a calibration time. In this case, "a" and/or "b" may be defined for each of MAP, DBP, and SBP, and by applying the feature values MAP, DBP, and SBP after correction to each blood pressure estimation model, the MAP, DBP, and SBP may be estimated independently.

Figure 6:
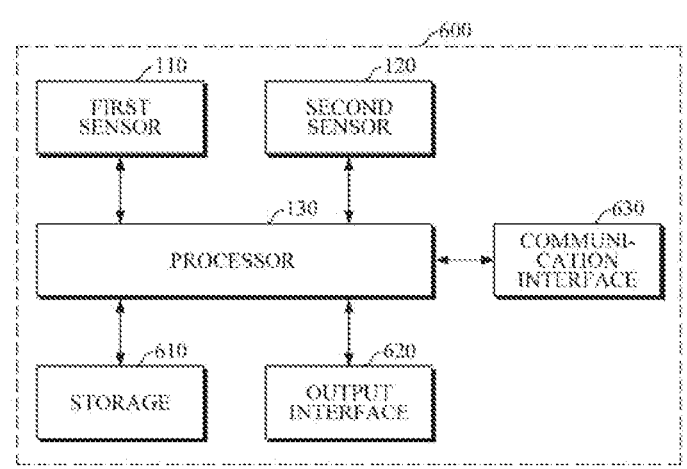
FIG. 6 is a block diagram illustrating an apparatus for estimating bio-information according to another embodiment of the present disclosure.

FIG. 6 is a block diagram illustrating an apparatus for estimating bio-information according to another embodiment of the present disclosure.

Referring to FIG. 6, the apparatus 600 for estimating bio-information includes the first sensor 110, the second sensor 120, the processor 130, a storage 610, an output interface 620, and a communication interface 630. The first sensor 110, the second sensor 120, and the processor 130 are described above in detail, such that a description thereof will be omitted below.

The storage 610 stores data related to bio-information estimation. For example, the storage 610 may store data including the pulse wave signals, the force/pressure, the oscillometric waveform envelope, the feature values before/after correction, the estimated bio-information value, and the like, which are measured and processed by the first sensor 110, the second sensor 120, and the processor 130. In addition, the storage 610 may store data including user characteristic information, such as a user's gender, age, health condition, etc., the reference blood pressure, the bio-information estimation model, the reference value, and the like, but the data are not limited thereto.

The storage 610 may include at least one storage medium of a flash memory type memory, a hard disk type memory, a multimedia card micro type memory, a card type memory (e.g., a secure digital (SD) memory, an extreme digital (XD) memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The output interface 620 may output data related to bio-information estimation. For example, the output interface 620 may output data including the pulse wave signals, the force/pressure, the oscillometric waveform envelope, the feature values, the estimated bio-information value, and the like, which are measured and processed by the first sensor 110, the second sensor 120, and the processor 130. The output interface 620 may output the data to a user by various visual/non-visual methods using a display, a sound output module, a haptic module, and the like.

The communication interface 630 may communicate with an external device by using wired or wireless communication techniques under the control of the processor 130, and may transmit and receive various data to and from the external device. For example, the communication interface 630 may transmit a bio-information estimation result to the external device, and may receive a variety of reference information for estimating blood pressure from the external device. In this case, the external device may include an information processing device such as a cuff manometer, a smartphone, a tablet PC, a desktop computer, a laptop computer, and the like.

In this case, the communication techniques may include Bluetooth communication, Bluetooth Low Energy (BLE) communication, Near Field Communication (NFC), wireless local area network (WLAN) communication, Zigbee communication, Infrared Data Association (IrDA) communication, wireless fidelity (Wi-Fi) Direct (WFD) communication, Ultra-Wideband (UWB) communication, Ant+communication, Wi-Fi communication, Radio Frequency Identification (RFID) communication, 3G communication, 4G communication, 5G communication, and the like. However, the foregoing communication techniques are merely examples and are not intended to be limiting.

Figure 7:
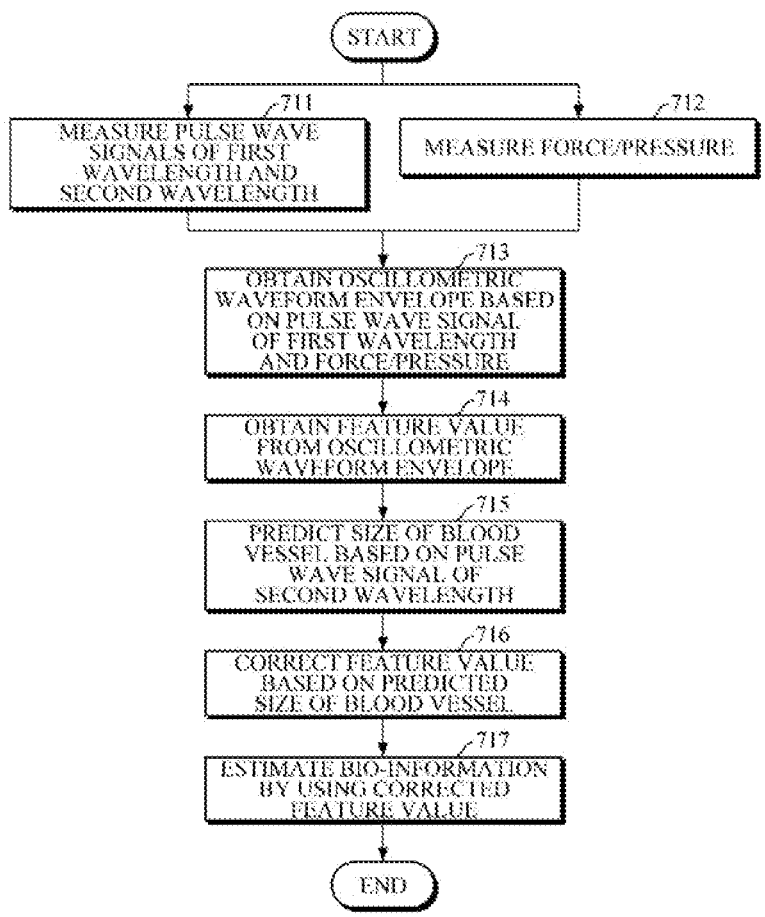
FIG. 7 is a flowchart illustrating a method of estimating bio-information according to an embodiment of the present disclosure.

FIG. 7 is a flowchart illustrating a method of estimating bio-information according to an embodiment of the present disclosure.

The method of FIG. 7 is an example of a method of estimating bio-information performed by the apparatus for estimating bio-information according to an embodiment of FIG. 1 or FIG. 6, which is described above in detail and thus will be briefly described below.

Based on an object contacting the first sensor, the apparatus for estimating bio-information may measure pulse wave signals of a first wavelength and a second wavelength from the object by using the first sensor in operation 711. In this case, the first wavelength may be an infrared wavelength, and the second wavelength may be a green wavelength.

Further, by using the second sensor, the apparatus for estimating bio-information may measure force/pressure applied by the object to the first sensor based on the object being in contact with the first sensor in operation 712.

The apparatus for estimating bio-information may obtain an oscillometric waveform envelope based on the pulse wave signal of the first wavelength and the force/pressure in operation 713. For example, the apparatus for estimating bio-information may obtain the oscillometric waveform envelope based on a difference between peak and trough of an AC component of a pulse wave signal having an infrared wavelength, and the force/pressure.

The apparatus for estimating bio-information may obtain a feature value from the oscillometric waveform envelope in operation 714. For example, the apparatus for estimating bio-information may detect, as characteristic points, a peak point of the oscillometric waveform envelope and/or points preceding and following the peak point and corresponding to a predetermined ratio to the peak point, and may obtain force/pressure values of the detected characteristic points as feature values.

The apparatus for estimating bio-information may predict a size of the measured blood vessel based on the pulse wave signal of the second wavelength in operation 715. For example, the apparatus for estimating bio-information may extract a DC component from the pulse wave signal of the second wavelength, and may normalize the DC component. Further, by comparing the DC component value, corresponding to the force/pressure value of the characteristic point extracted in operation 714, with the reference value, the apparatus for estimating bio-information may predict the size of the measured blood vessel compared to the target blood vessel.

The apparatus for estimating bio-information may correct the feature value, obtained in operation 714, based on the predicted size of the blood vessel in operation 716. For example, based on the difference between the DC component value, corresponding to the force/pressure of the characteristic point extracted in operation 714, and the reference value, the apparatus for estimating bio-information may determine a degree of increase or decrease in the DC component value, and may obtain a corrected feature value by reflecting the determined degree of increase or decrease in the feature value.

The apparatus for estimating bio-information may estimate bio-information by using the corrected feature value in operation 717.

Figure 8:
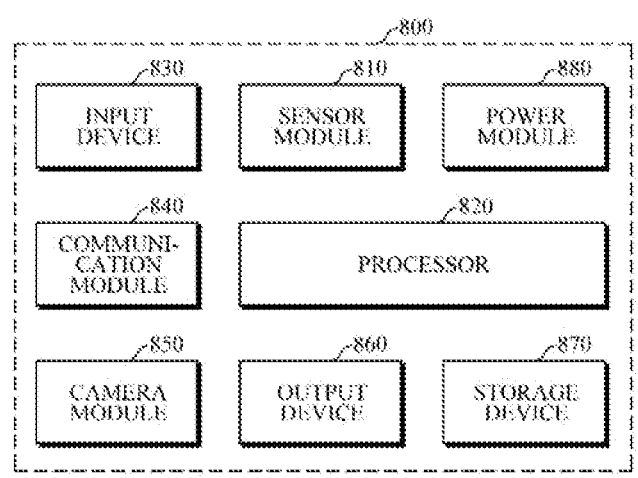
FIG. 8 is a block diagram illustrating an example of an electronic device including an apparatus for estimating bio-information.
Figure 9:
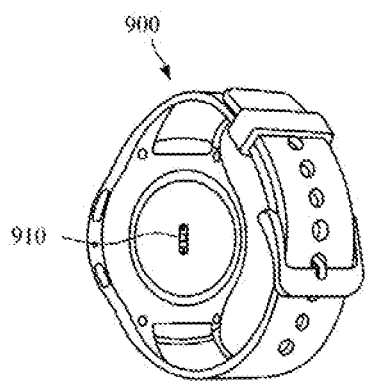
FIG. 9 is a diagram illustrating a wristwatch wearable device as an example of the electronic device of FIG. 8.
Figure 10:
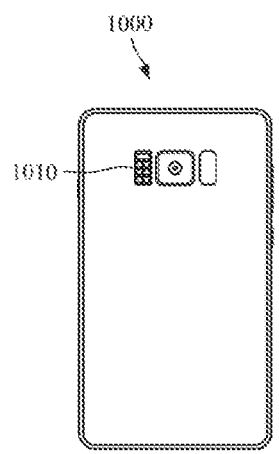
FIG. 10 is a diagram illustrating a mobile device as an example of the electronic device of FIG. 8.
Figure 11:
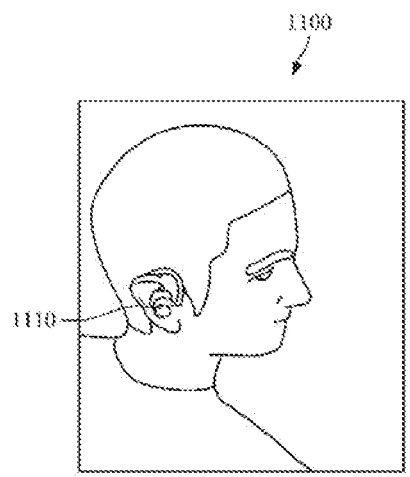
FIG. 11 is a diagram illustrating an ear-wearable device as an example of the electronic device of FIG. 8.

FIG. 8 is a block diagram illustrating an example of an electronic device including an apparatus for estimating bio-information. FIG. 9 is a diagram illustrating a wristwatch wearable device as an example of the electronic device of FIG. 8. FIG. 10 is a diagram illustrating a mobile device as an example of the electronic device of FIG. 8. FIG. 11 is a diagram illustrating a ear-wearable device as an example of the electronic device of FIG. 8.

Referring to FIG. 8, the electronic device 800 may include a sensor module 810, a processor 820, an input device 830, a communication module 840, a camera module 850, an output device 860, a storage device 870, and a power module 880. All the components of the electronic device 800 may be integrally mounted in a specific device or may be distributed in two or more devices. The components of the aforementioned apparatuses 100 and 600 for estimating bio-information may be integrated into the components of the electronic device 800 or may be provided separately.

The sensor module 810 may include the first sensor and the second sensor. The first sensor may include a light source and a light receiver. In this case, the light source may include a light source of a green wavelength and a light source of an infrared wavelength. Based on an object contacting the first sensor, the first sensor may acquire pulse wave signals of the green wavelength and the infrared wavelength from the object. The second sensor may be disposed at an upper end or a lower end of the first sensor, and may measure force/pressure exerted between the object and the first sensor. The sensor module 810 may include various sensors such as a gyro sensor, a Global Positioning System (GPS), etc., for performing other functions.

The processor 820 may execute programs, stored in the storage device 870, to control components connected to the processor 820, and may perform various data processing or computation. The processor 820 may include a main processor such as a central processing unit (CPU) or an application processor (AP), etc., and an auxiliary processor such as a graphics processing unit (GPU), an image signal processor (ISP), a sensor hub processor, or a communication processor (CP), etc., which is operable independently from, or in conjunction with, the main processor.

Based on a user's request for estimating bio-information, the processor 820 may transmit a control signal to the sensor module 810, and may estimate bio-information by using the pulse wave signal of the infrared wavelength, the pulse wave signal of the green wavelength, and the force/pressure, which are received from the sensor module 810, by using the aforementioned method.

The input device 830 may receive a command and/or data to be used by each component of the electronic device 800, from a user, and the like. The input device 830 may include, for example, a microphone, a mouse, a keyboard, or a digital pen (e.g., a stylus pen, etc).

The communication module 840 may support establishment of a direct (e.g., wired) communication channel and/or a wireless communication channel between the electronic device 800 and another electronic device, a server, or the sensor module 810 within a network environment, and communication via the established communication channel. The communication module 840 may include one or more communication processors that are operable independently from the processor 820 and supports direct communication and/or wireless communication. The communication module 840 may include a wireless communication module such as a cellular communication module, a short-range wireless communication module, or a global navigation satellite system (GLASS) communication module, etc., and/or a wired communication module such as a local area network (LAN) communication module, a power line communication (PLC) module, and the like. These various types of communication modules may be integrated into a single chip, or may be separately implemented as multiple chips. The wireless communication module may identify and authenticate the electronic device 800 in a communication network by using subscriber information (e.g., international mobile subscriber identity (IMSI), etc.) stored in a subscriber identification module.

The camera module 850 may capture still images or moving images. The camera module 850 may include a lens assembly having one or more lenses, image sensors, image signal processors, and/or flashes. The lens assembly included in the camera module 850 may collect light emanating from an object to be imaged.

The output device 860 may visually/iron-visually output data generated or processed by the electronic device 800. The output device 860 may include a sound output device, a display device, an audio module, and/or a haptic module.

The sound output device may output sound signals externally to the electronic device 800. The sound output device may include a speaker and/or a receiver. The speaker may be used for general purposes, such as playing multimedia, and the receiver may be used for incoming calls. The receiver may be implemented separately from, or as pail of, the speaker.

The display device may visually provide information externally to the electronic device 800. The display device may include, for example, a display, a hologram device, or a projector and control circuitry to control the devices. The display device may include touch circuitry adapted to detect a touch, and/or sensor circuitry (e.g., pressure sensor, etc.) adapted to measure the intensity of force incurred by the touch.

The audio module may convert sound into an electrical signal or vice versa. The audio module may obtain the sound via the input device, or may output the sound via the sound output device, and/or a speaker and/or a headphone of another electronic device directly or wirelessly connected to the electronic device 800.

The haptic module may convert an electrical signal into a mechanical stimulus (e.g., vibration, motion, etc.) or electrical stimulus which may be recognized by a user by tactile sensation or kinesthetic sensation. The haptic module may include, for example, a motor, a piezoelectric element, and/or an electric stimulator.

The storage device 870 may store driving conditions for driving the sensor module 810, and various data for other components of the electronic device 800. The various data may include, for example, software and input data and/or output data for a command related thereto. The storage device 870 may include a volatile memory and/or a non-volatile memory.

The power module 880 may manage power supplied to the electronic device 800. The power module 880 may be implemented as part of a power management integrated circuit (PMIC). The power module 880 may include a battery, including a primary cell which is not rechargeable, a secondary cell which is rechargeable, and/or a fuel cell.

FIGS. 9 to 11 are diagrams illustrating examples of structures of the electronic device 800 of FIG. 8.

Referring to FIG. 9, the electronic device 800 may be implemented as a wristwatch wearable device 900, and may include a main body and a wrist strap. A display is provided on a front surface of the main body, and nay display various application screens, including time information, received message information, and the like. A sensor module 910 may be disposed on a rear surface of the main body to measure a pulse wave signal and force/pressure for estimating bio-information.

Referring to FIG. 10, the electronic device 800 may be implemented as a mobile device 1000 such as a smartphone.

The mobile device 1000 may include a housing and a display panel. The housing may form an exterior of the mobile device 1000. The housing has a first surface, on which a display panel and a cover glass may be disposed sequentially, and the display panel may be exposed to the outside through the cover glass. A sensor module 1010, a camera module and/or an infrared sensor, and the like, may be disposed on a second surface of the housing. Based on a user transmitting a request for estimating bio-information by executing an application, and the like, installed in the mobile device 1000, the mobile device 1000 may estimate bio-information by using the sensor module 1010, and may provide the estimated bio-information value as images and/or sounds to a user.

Referring to FIG. 11, the electronic device 800 may be implemented as an ear-wearable device 1100.

The ear-wearable device 1100 may include a main body and an ear strap. A user may wear the ear-wearable device 1100 by hanging the ear strap on a user's auricle. The ear strap may be omitted depending on the type of ear-wearable device 1100. The main body may be inserted into the external auditory meatus. A sensor module 1110 may be mounted in the main body. The ear-wearable device 1100 may provide a blood pressure estimation result as sounds to a user, or may transmit the estimation result to an external device such as a mobile device, a tablet PC, a personal computer, etc., through a communication module provided in the main body.

Example embodiments of the present disclosure may be implemented by code stored on a non-transitory computer-readable medium and executed by a processor. The computer-readable medium may be any type of recording device in which data is stored in a computer-readable manner.

Examples of the computer-readable medium include a ROM, a RAM, a CD-ROM a magnetic tape, a floppy disc, an optical data storage, and a carrier wave (e.g., data transmission through the Internet). The computer-readable medium can be distributed over a plurality of computer systems connected to a network so that computer-readable code is written thereto and executed therefrom in a decentralized manner. Functional programs, code, and code segments for implementing example embodiments of the present disclosure can be deduced by programmers of ordinary skill in the art to which the present disclosure pertains.

The present disclosure has been described herein with regard to example embodiments. However, it will be obvious to those skilled in the art that various changes and modifications can be made without departing from the scope of the present disclosure. Thus, it is clear that the above-described embodiments are illustrative in all aspects and are not intended to limit the present disclosure.

What is claimed is:

1. An apparatus for estimating bio-information, the apparatus comprising:
    a first sensor configured to emit a first wavelength to an object and measure a first pulse wave signal of the first wavelength from the object, further configured to emit a second wavelength to the object and measure a second pulse wave signal of the second wavelength from the object;
    a second sensor configured to measure at least one of a force or a pressure applied to the object; and
    a processor configured to:
        generate an oscillometric waveform envelope based on the first pulse wave signal of the first wavelength and the at least one of the force or the pressure applied to the object;
        obtain a feature value from the oscillometric waveform envelope;
        predict a size of a measured blood vessel based on the second pulse wave signal of the second wavelength, the processor using the second pulse wave signal to compensate for contact position between a target blood vessel and the measured blood vessel, which is irradiated by the first sensor;
        correct the feature value based on the size of the measured blood vessel and relative position of the measured blood vessel and target blood vessel; and
        estimate the bio-information based on correcting the feature value; and
    an output device providing at least one of an audio output and a visual output of the estimated bio-information comprising blood pressure,
    wherein the first wavelength is an infrared wavelength, and the second wavelength is a green wavelength,
    wherein the processor is further configured to detect a characteristic point from the oscillometric waveform envelope; and obtain the feature value based on the characteristic point,
    wherein the processor is further configured to extract a direct current (DC) component of the second pulse wave signal of the second wavelength; and predict the size of the measured blood vessel, the extracted DC component of the second pulse wave signal corresponding to the force value or the pressure value of the characteristic point,
    wherein the processor is further configured to:
    estimate the bio-information based on the feature value by using a bio-information estimation model, and the corrected feature value is applied to the bio-information estimation model.

2. The apparatus of claim 1, wherein the processor is configured to generate the oscillometric waveform envelope based on a difference between a peak and a trough of an alternating current (AC) component of the first pulse wave signal of the first wavelength, and the at least one of the force or the pressure.

3. The apparatus of claim 1, wherein the characteristic point comprises at least one of a peak point of the oscillometric waveform envelope, a preceding point preceding the peak point and corresponding to a predetermined ratio to an amplitude value of the peak point, and a following point following the peak point and corresponding to the predetermined ratio to the amplitude value of the peak point.

4. The apparatus of claim 1, wherein the feature value comprises an amplitude value of the characteristic point.

5. The apparatus of claim 1, wherein the processor is further configured to:
    normalize the DC component of the second pulse wave signal of the second wavelength;
    in response to a normalized DC component value, corresponding to the force value or the pressure value of the characteristic point, being less than a reference value, predict that the size of the measured blood vessel is less than a size of the target blood vessel; and
    in response to the normalized DC component value exceeding the reference value, predict that the size of the measured blood vessel is greater than the size of the target blood vessel,
    wherein the target blood vessel is located within the object in a region irradiated by the first wavelength and the second wavelength.

6. The apparatus of claim 5, wherein the processor is further configured to:
    based on predicting that the size of the measured blood vessel is less than the size of the target blood vessel, increase the feature value; and
    based on predicting that the size of the measured blood vessel is greater than the size of the target blood vessel, decrease the feature value.

7. The apparatus of claim 6, wherein the processor is further configured to:
    based on a difference between the normalized DC component value and the reference value, determine a degree of increase or decrease in the feature value.

8. An electronic device comprising an apparatus for estimating bio-information, and an output device configured to output a processing result of the apparatus for estimating the bio-information,
    wherein the apparatus for estimating the bio-information comprises:
        a first sensor configured to emit a first wavelength to an object and measure a first pulse wave signal of the first wavelength from the object, and further configured to emit a second wavelength to the object and measure a second pulse wave signal of the second wavelength from the object;
        a second sensor configured to measure at least one of a force or a pressure applied to the object; and
        a processor configured to:
            generate an oscillometric waveform envelope based on the first pulse wave signal of the first wavelength and the at least one of the force or the pressure applied to the object;
            obtain a feature value from the oscillometric waveform envelope;
            predict a size of a measured blood vessel based on the second pulse wave signal of the second wavelength, the processor using the second pulse wave signal to compensate for contact position between a target blood vessel and the measured blood vessel irradiated by the first sensor;
            correct the feature value based on the size of the measured blood vessel and relative position of the measured blood vessel and target blood vessel;
            estimate the bio-information based on correcting the feature value; and providing at least one of an audio output and a visual output of the estimated bio-information comprising blood pressure,
wherein the first wavelength is an infrared wavelength, and the second wavelength is a green wavelength,
wherein the processor is further configured to
detect a characteristic point from the oscillometric waveform envelope; and
obtain the feature value based on the characteristic point,
wherein the processor is further configured to
extract a direct current (DC) component of the second pulse wave signal of the second wavelength; and
predict the size of the measured blood vessel based on the extracted DC component value, the extracted DC component of the second pulse wave signal corresponding to the force value or the pressure value of the characteristic point; and
update a bio-information estimation model for estimating the bio-information based on the corrected feature value.

9. The electronic device of claim 8, wherein the electronic device comprises at least one of a wristwatch wearable device, an ear-wearable device, and a mobile device.

10. The electronic device of claim 8, wherein the processor is further configured to:
normalize the DC component of the second pulse wave signal of the second wavelength;
in response to a normalized DC component value, corresponding to the force value or the pressure value of the characteristic point, being less than a reference value, predict that the size of the measured blood vessel is less than a size of the target blood vessel; and
in response to the normalized DC component value exceeding the reference value, predict that the size of the measured blood vessel is greater than the size of the target blood vessel;
wherein the target blood vessel is located within the object in a region irradiated by the first wavelength and the second wavelength.

11. The electronic device of claim 10, wherein the processor is further configured to:
based on predicting that the size of the measured blood vessel is less than the size of the target blood vessel, increase the feature value; and
based on predicting that the size of the measured blood vessel is greater than the size of the target blood vessel, decrease the feature value.

12. An apparatus for estimating blood pressure of a user, the apparatus comprising:
a first sensor configured to emit a first wavelength to an object and measure a first pulse wave signal of an infrared wavelength and further configured to emit a second wavelength to the object and measure a second pulse wave signal of a green wavelength from the object of the user, the second pulse wave signal compensating for contact position between a target blood vessel and a measured blood vessel irradiated by the first sensor;
a second sensor configured to measure at least one of a force or a pressure applied to the object of the user; and
a processor configured to:
generate an oscillometric waveform envelope based on the first pulse wave signal of the infrared wavelength and the at least one of the force or the pressure applied to the object;
obtain a feature value from the oscillometric waveform envelope;
correct the feature value based on the second pulse wave signal of the second wavelength;
estimate the blood pressure of the user based on correcting the feature value; and
an output device providing at least one of an audio output and a visual output of the estimated bio-information comprising blood pressure; and
an output device providing at least one of an audio output and a visual output of the estimated bio-information comprising one or more of a blood pressure, an aortic pressure waveform, a vascular compliance, and a stress index,
wherein the first wavelength is an infrared wavelength, and the second wavelength is a green wavelength,
wherein the processor is further configured to
detect a characteristic point from the oscillometric waveform envelope; and
obtain the feature value based on the characteristic point,
wherein the processor is further configured to
extract a direct current (DC) component of the second pulse wave signal of the second wavelength; and
predict the size of the measured blood vessel based on the extracted DC component of the second pulse wave signal which corresponds to the force value or the pressure value of the characteristic point; and
update a bio-information estimation model for estimating the bio-information based on the corrected feature value.

* * * * *